United States Patent [19]

Green

[11] E Re. 30,651

[45] Reissued Jun. 16, 1981

[54] PROCESS FOR PRODUCING A ROASTED PEANUT PRODUCT

[75] Inventor: William M. Green, Robersonville, N.C.

[73] Assignee: Carolina Peanuts of Robersonville, Inc., Robersonville, N.C.

[21] Appl. No.: 120,761

[22] Filed: Feb. 11, 1980

Related U.S. Patent Documents

Reissue of:

[64] Patent No.: 4,085,230
Issued: Apr. 18, 1978
Appl. No.: 448,666
Filed: Mar. 6, 1974

[51] Int. Cl.[3] ..... A23L 1/36

[52] U.S. Cl. ..... 426/262; 426/293; 426/632; 426/441

[58] Field of Search ..... 426/441, 438, 262, 268, 426/270, 251, 289, 293, 295, 302, 304, 309, 632, 633, 445, 446, 460, 456

[56] References Cited

U.S. PATENT DOCUMENTS

| | | | |
|---|---|---|---|
| 2,498,024 | 2/1950 | Baxter | 426/268 |
| 2,653,875 | 9/1953 | Wergeland | 426/441 |
| 2,813,029 | 11/1957 | Shirk | 426/632 |
| 3,062,660 | 11/1962 | Aukonis et al. | 426/309 |
| 3,085,016 | 4/1963 | Merker | 426/268 |
| 3,167,035 | 1/1965 | Benson | 426/309 |
| 3,689,287 | 9/1972 | Mitchell | 426/457 |

FOREIGN PATENT DOCUMENTS 46-3099 1/1971 Japan .

OTHER PUBLICATIONS

Peanuts: Production, Processing, Products, Woodroff 2nd Ed. 1973.
Potato Processing, Talburt & Smith 2nd Ed.
Agricultural & Food Chemistry Reprint, vol. 1, No. 10, pp. 668-671 8/5/53.
J. Amer. Peanut Res. & Ed. Assoc. Inc, Reprint, vol. 3, No. 1, 1971.
Agricultural & Food Chem., vol. 7, No. 4, pp. 274-278 Reprint.
Food Dehydration, 2nd Ed., vol. 2, 1973, Van Arsdel et al., Avi Publ., p. 509.
Hackh's Chem. Dict.-4th Ed., Grant, McGraw Hill, p. 102.

*Primary Examiner*—Steven L. Weinstein
*Attorney, Agent, or Firm*—B. B. Olive

[57] ABSTRACT

In abstract, a preferred embodiment of this invention is an improved roasted type peanut product and the process by which it is produced. The process includes precooking the peanuts in boiling water with a color additive ingredient, removing the peanuts and placing them in hot vegetable oil for a predetermined period of time, removing the same, coating with a light film of oil and salting the same. The product has a longer shelf life and is of a much more palatable taste than what would ordinarily be expected.

8 Claims, No Drawings

PROCESS FOR PRODUCING A ROASTED PEANUT PRODUCT

Matter enclosed in heavy brackets [ ] appears in the original patent but forms no part of this reissue specification; matter printed in italics indicates the additions made by reissue.

This invention relates to food products and more particularly to roasted peanuts and the process by which they are produced.

In the past, peanuts have generally been produced by roasting the same in either vegetable oil or in hot dry air at a temperature generally in the range of 340° to 375° F. Peanuts roasted by these conventional methods often become overroasted or underroasted if the time and temperature is not carefully controlled. Also, because of the open or porous structure of conventional roasted peanuts, they are extremely subject to rancidity. Because of the rancidity problems, roasted peanuts are normally packed under vacuum or in an inert atmosphere in order to insure acceptable storage stability.

In addition to the above, the high localized temperature obtained on the surface of conventionally roasted peanuts may cause such surface to become overroasted before the center roast is complete. This often causes a burned and greasy flavor to be imparted to the product.

After much research and study into the above mentioned problems, the present invention has been developed to overcome the inadequacies of hte prior conventional roasting methods. The present invention, in addition to its improved flavor quality, produces a finished product with an attractive non-conventional appearance that exhibits a crunchy, extremely palatable texture when eaten. The peanuts prepared by the present invention exhibit a pimply or nodular surface which is very attractive and yet does not distract from the enhanced taste of the pròduct.

In view of the above, it is an object of the present invention to provide a process for producing a superior product with greater than normal shelf life.

Another object of the present invention is to provide an improved peanut product of excellent flavor and appearance.

A further object of the present invention is to provide a roasted type peanut product that is firmer and more crunchy and yet has a tender type texture when eaten.

An even further object of the present invention is to provide a process which results in improved control over the amount of browning occurring during roasting.

An additional object of the present invention is to provide a product that is less porous on the surface and in the interior than products produced by conventional methods thereby aiding in the resistance to oxidation of internal fat content of the nut.

Another object of the present invention is to provide a peanut type product that possesses lower oil content and exhibits less oily exterior appearance than products produced by heretofore known conventional processes.

Other objects and advantages of the present invention will become apparent and obvious from a study of the following description which is merely illustrative of such invention.

In a preferred embodiment of the present invention, the skins are removed from deshelled raw peanuts in the conventional manner. The peanuts are then precooked in hot water at a temperature ranging from 190° to 212° Fahrenheit for a period of 4 to 12 minutes. The precooked peanuts are then removed from the hot water and the excess surface moisture is removed by vibration or other suitable means. The peanuts are then placed into a hot edible oil bath which is maintained at a temperature between 320° and 380° Fahrenheit. The peanuts are retained in the hot oil bath until optimum cooking is obtained. The time in the cooking medium depends on the temperature of the oil and generally ranges between 3 and 8 minutes.

From the oil bath, the freshly roasted peanuts are removed, drained and cooled. Experimentation has shown that a better flavored product can be obtained by spraying the surface of the peanuts with a small amount of liquid oil or fat, generally ranging from 1 to 3 percent by weight of the peanuts. This liquid fat spray is applied just prior to salting of the product. It not only adds to the flavor thereof but it also aids in the sticking of the salt to the surface of the peanuts. The salting step is, of course, accomplished to add flavoring and taste to the final product.

Peanuts produced by above described process have had a tendency to become somewhat blanched in appearance without the desirable characteristic brown color of roasted peanuts. After extensive experimentation, it has been found that the final product color can be greatly improved and controlled by adding a small amount of reducing sugar such as dextrose or fructose to the water bath step in the precooking of the peanuts. Excellent results have been obtained with a concentration of reducing sugar in the range of 0.02 to 1.0 percent by weight. A combination of fructose and dextrose in cumulative additive amounts equaling the percentages set forth above have been found effective. It has further been discovered that corn syrup or corn syrup solids containing reducing sugar can be utilized to obtain the desired color in the finished product. The reducing sugar content from corn syrup or corn syrup solids should conform to the percentage range recommended for dextrose, fructose or the combination of the two set forth above.

Although extensive experimentation and analysis has been conducted, the reason for the longer shelf life obtained with peanuts roasted as hereinabove described and the lower fat content obtained therein is not fully known. It has been hypothesized, however, that the raw peanuts in the hot water begin to cook. The air entrapped in the nut during this step of the process begins to come out of the interior thereof. The pores of the nuts are sealed with the solubilized protein and other natural substances. When the peanuts are later roasted in the hot oil, such oil is prevented from moving into the interior of the peanuts because of the sealed pores. Oxygen from the ambient air is also prevented from moving into the interior of the nuts by the same barrier thus resulting in less oxidation and thereby creating longer shelf life.

The pimply or modular surface exhibited by peanuts roasted in the process of the present invention is probably due to the formation of steam pockets under the surface of the outer layer of tissue when the precooked peanuts are introduced to the hot cooking oil. These nodules on the surface of the peanuts prepared by the process of the present invention not only contribute to the texture of the final product but also acts as an excellent indicator that the procedure of the present invention was followed.

In an example of the process by which the product of the present invention is produced, 10 pounds of raw peanuts with the skins removed are precooked in a hot water solution containing 0.2 percent dextrose by weight at a temperature of 212° Fahrenheit for a period of 8 minutes. At the end of this precooking step in the dextrose solution, the nuts are removed and drained. The nuts are thereafter roasted in hot edible vegetable oil at a temperature of 340° Fahrenheit for a period of 3.5 minutes. They are then drained and cooled to ambient temperature by a forced air system. The cooled, roasted peanuts are then coated with 2 percent peanut oil based on the weight of the peanuts, salted with 2 percent salt by weight and packaged.

Another example of the process for producing the superior peanut product of the present invention is to take 10 pounds of raw peanuts with the skins removed and precook the same in boiling water at 210° Fahrenheit for a period of 10 minutes. The peanuts are then drained, followed by submersion in hot edible vegetable oil and roasted for 3.5 minutes at a temperature of approximately 340° Fahrenheit. The peanuts are then removed from the oil, drained, cooled to ambient temperature by forced air, salted and packaged.

A third example of the process of the present invention is to take 10 pounds of raw peanuts and precook the same in hot water at a temperature of 212° Fahrenheit for a period of 8 minutes. The peanuts are then drained, sprayed with 0.5 percent dextrose solution and roasted in vegetable oil for 3.5 minutes at 340° Fahrenheit, drained, cooled and salted. The peanuts are then ready for packaging.

In the above examples, the first and third give a superior product because of the coloring imparting by the reducing sugar in the form of dextrose. Since this is considered commercially desirable, these two processes will ordinarily be followed rather than a process set forth in the second example.

From the above, it is obvious that the present invention has the advantages of providing a simple yet efficient method of roasting peanuts for edible purposes which produces a superior product to that heretofore available. The texture, exterior configuration and color of the product are all of excellent quality. Because of the above indicated qualities, the process of the present invention has met extensive commercial success.

The present invention may, of course, be carried out in other specific ways than those herein set forth without departing from the spirit and essential characteristics of the invention. The present embodiments are therefore to be considered in all respects as illustrative and not restrictive and all changes coming within the meaning and equivalency range of the appended claims are intended to be embraced therein.

What is claimed is:

1. The process of preparing a roasted peanut product comprising: removing the shells and skins from raw peanuts; precooking said peanuts over a period of from about 4 to 12 minutes in a water solution which contains from between about 0.02 to 1.0 percent by weight of a reducing sugar and wherein said water solution is maintained at a temperature in the range of from about 190° to 212° F. throughout said precooking operation; removing said peanuts from said hot precooking cooking solution and eliminating excess water from the exterior of such peanuts; roasting said peanuts in a bath of hot edible oil for a period of 3 to 8 minutes at a temperature ranging from 320° to 380° Fahrenheit; removing said roasted peanuts from said oil bath and draining excess oil therefrom; cooling said peanuts to approximate ambient temperature; coating said peanuts with a liquid edible oil or fat ranging from 1 to 3 percent by weight of the peanuts; salting said peanuts to impart a favorable flavor thereto; and packaging said peanuts whereby a superior roasted peanut product is produced.

2. The process of claim 1 wherein the reducing sugar is dextrose.

3. The process of claim 1 wherein the reducing sugar is fructose.

4. The process of claim 1 wherein the reducing sugar is a combination of dextrose and fructose.

5. The process of claim 1 wherein the reducing sugar is corn syrup or corn syrup solids.

6. The process of preparing a roasted peanut product comprising: removing the shells and skins from raw peanuts; precooking said peanuts from 4 to 12 minutes in a water solution which contains between 0.1 and 1.0 percent by weight of a reducing sugar selected from the group consisting of dextrose, fructose, corn syrup and corn syrup solids wherein said water solution is maintained at a temperature ranging from 190° to 212° Fahrenheit; removing said precooked peanuts and draining the same; placing said peanuts in a bath of hot edible oil for a period of 3 to 8 minutes at a temperature ranging from 320° to 380° Fahrenheit; removing said peanuts from said bath of hot edible oil and draining the same; cooling said peanuts to approximate ambient temperature; coating the same with between 1 and 3 percent by weight of an edible oil or liquid fat; and salting said peanuts to taste whereby an improved peanut product is provided.

7. The process of preparing a roasted peanut product comprising: removing the shells and skins from raw peanuts; precooking said peanuts in hot water maintained at a temperature ranging from 190° to 212° Fahrenheit for a period of from 4 to 12 minutes; removing said peanuts from said hot water and draining the same; spraying said drained peanuts with a water solution which contains between 0.02 and 1.0 percent by weight of a reducing sugar selected from the group consisting of dextrose, fructose, corn syrup and corn syrup solids; roasting said peanuts in a bath of hot edible oil for a period of 3 to 8 minutes at a temperature from 320° to 380° Fahrenheit; removing said peanuts from said bath and draining the same; coating said peanuts with from between 1 and 3 percent by weight of a vegetable oil or liquid fat; and salting said peanuts to taste whereby a superior peanut product is produced.

*8. The process of preparing a roasted peanut product comprising: removing the shells and skins from raw peanuts; precooking said peanuts over a period of from about 4 to 12 minutes in a water solution maintained at a temperature in the range of from about 190° to 212° F. throughout said precooking operation; removing said peanuts from said hot precooking cooking solution and eliminating excess water from the exterior of such peanuts; roasting said peanuts in a bath of hot edible oil for a period of 3 to 8 minutes at a temperature ranging from 320° to 380° Fahrenheit; removing said roasted peanuts from said oil bath and draining excess oil therefrom; cooling said peanuts to approximate ambient temperature; coating said peanuts with a liquid edible oil or fat ranging from 1 to 3 percent by weight of the peanuts; salting said peanuts to impart a favorable flavor thereto; and packaging said peanuts whereby a superior roasted peanut product is produced.*

* * * * *

UNITED STATES PATENT OFFICE

CERTIFICATE OF CORRECTION

Patent No. Reissue 30651 Dated June 16, 1981

Inventor(s) William M. Green

It is certified that error appears in the above-identified patent and that said Letters Patent are hereby corrected as shown below:

Col. 1, line 31, "hte" should be --the--.

Col. 2. line 59, "modular" should be --nodular--.

Signed and Sealed this

First Day of September 1981

[SEAL]

Attest:

GERALD J. MOSSINGHOFF

Attesting Officer

Commissioner of Patents and Trademarks